Nov. 5, 1940.   F. E. MAIER   2,220,254
WHEEL SUSPENSION
Original Filed Nov. 27, 1935   2 Sheets-Sheet 1
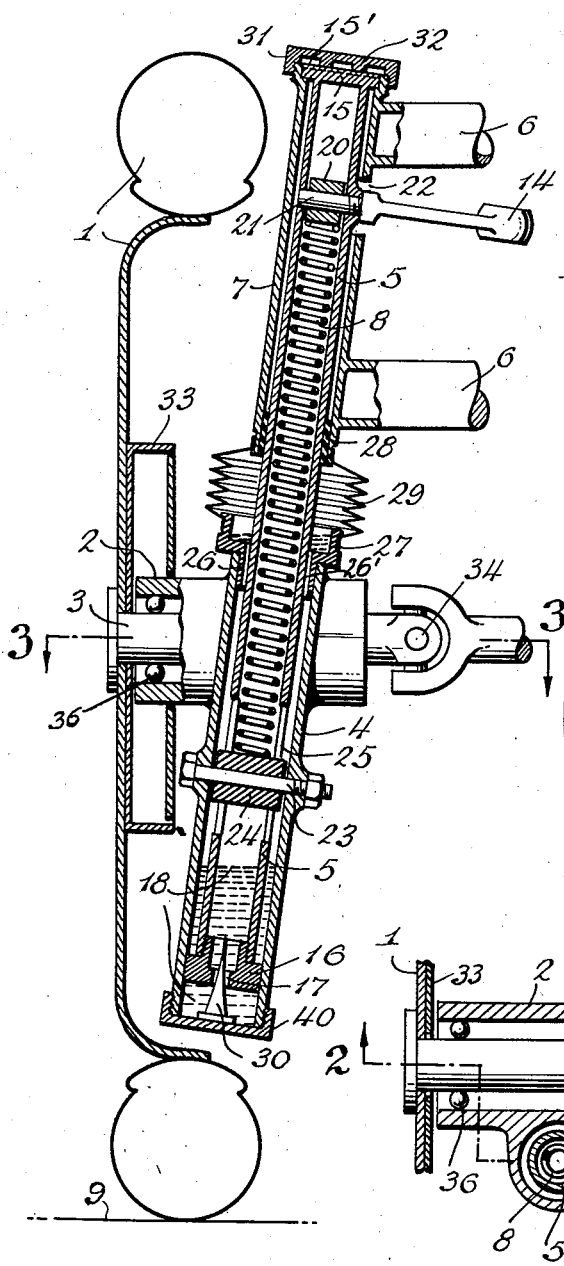
INVENTOR.
FRIEDRICH E. MAIER
BY  Lotka & Kehlenbeck
ATTORNEYS

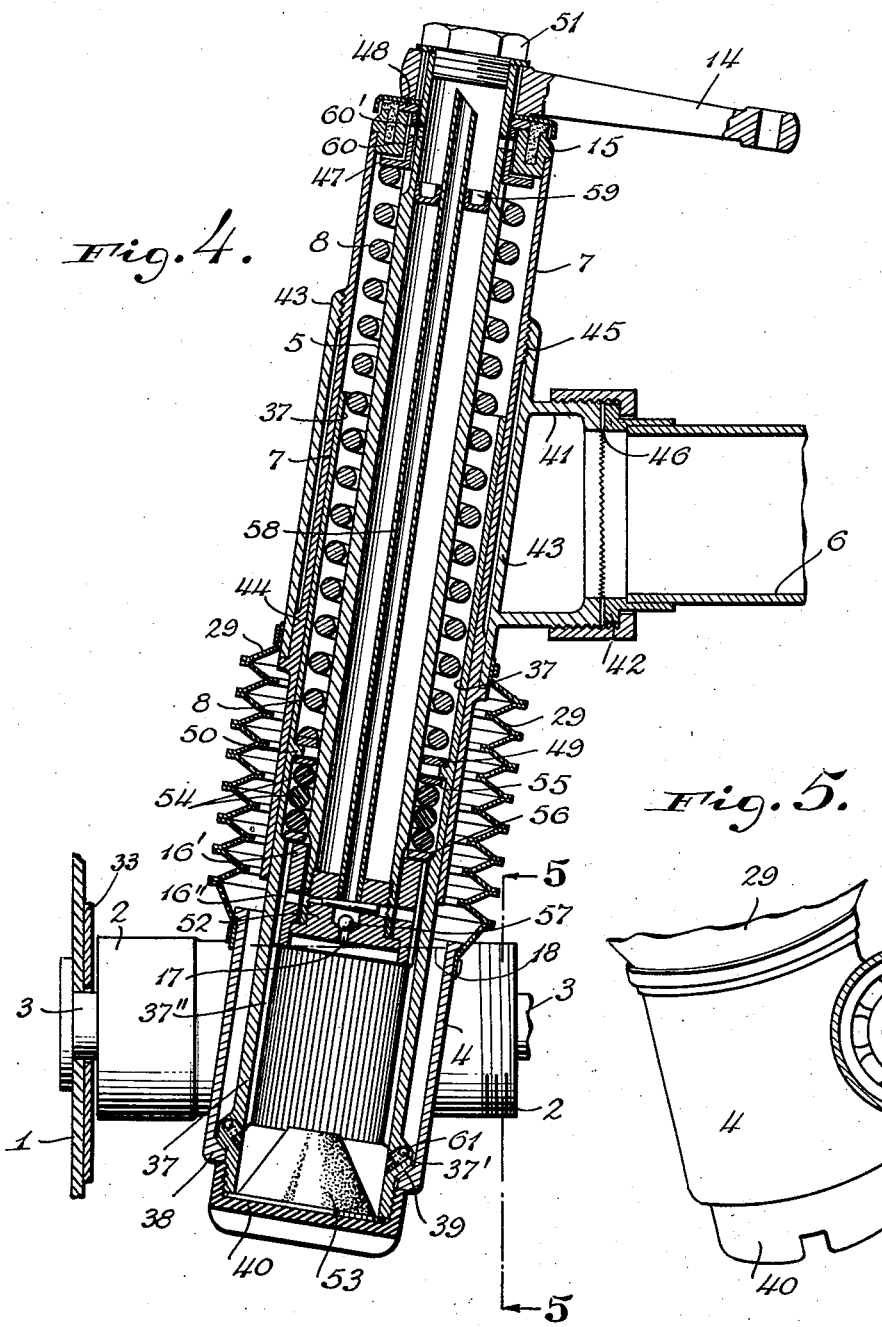

Patented Nov. 5, 1940

2,220,254

UNITED STATES PATENT OFFICE 2,220,254

WHEEL SUSPENSION

Friedrich Eugen Maier, Berlin-Charlottenburg, Germany

Application November 27, 1935, Serial No. 51,820. Renewed May 6, 1940. In Germany November 28, 1934

8 Claims. (Cl. 280—96.2)

The present invention relates to an arrangement for individually supporting a road wheel of automobiles and the like, by a telescopic tubular guide disposed between such wheel and the frame or body of the vehicle. It is an object of the invention to provide for such a telescopic tubular guide the necessary constructional freedom both for the horizontal axle of the road wheel and for the up and down play of a spring or its equivalent. The axle of the wheel can be readily connected to the drive, so that such a telescopic tubular guide will be adapted to driving wheels not steered, but the invention is also applicable to road wheels which are steered and not driven.

According to my invention, I employ an upright cylinder or tubular guide connected or provided with a wheel-supporting axle of tubular character. The said guide and axle are rigid with one another. The tubular axle receives a shaft or spindle connected with the road wheel and available to connect such wheel with the driving mechanism if such wheel is a driven wheel. Within said cylinder or tubular guide is adapted to move lengthwise, a member subject to the influence of a spring or other cushioning device and fastened to the frame of the vehicle. This member and the said guide extend to one side of the wheel axle, and it thus becomes possible to dispose the said member and its guide partly within the wheel and thereby reduce the total height of the vehicle.

A further advantage of the invention is that there is one guide only which is arranged close to or even below the wheel axle and thus reduces the pressure acting upon the guide; the interior bored surface of the upright tube or cylinder can be used directly as a guide surface, so that a structural member is saved.

Another object of the invention is to design the upright guide cylinder with a closed bottom so as to permit the insertion of a shock absorber, for instance a shock-absorbing liquid. In this case the guide also serves as the cylinder of the shock absorber, while the cooperating member fastened to the frame of the vehicle constitutes the piston of such shock absorber. The same element will thus be utilized for two different functions.

A further improvement according to the invention consists in effecting a circulation or supply of a lubricant by the movement of said member relatively to its guide, which movement is a result of the vibration of the car as it travels on the road.

In one form of my invention, the guide connected with the wheel axle comprises an outer cylinder and an inner cylinder the outer surface of which is in sliding engagement with a tubular member or cylinder secured to the frame of the vehicle. This construction facilitates the assembly of the entire device and gives the telescopic device additional safety against the entrance of dust.

Other features of the invention are disclosed in the description following hereinafter.

In the accompanying drawings

Fig. 1 is a diagrammatical elevation of a typical embodiment of my invention, with parts in section.

Fig. 2 shows a telescopic tubular guide on a larger scale, partially in section on line 2—2 of Fig. 3, the latter being a horizontal section on line 3—3 of Fig. 2.

Fig. 4 is a vertical sectional view of another embodiment of the telescopic tubular guide.

Fig. 5 is an elevation of the bottom portion of Fig. 4, with parts in section on line 5—5 of Fig. 4.

In the embodiment illustrated by Figs. 1 to 3, the road wheel 1 of the motor car is supported in a well-known manner upon a stub axle 2, which however is tubular instead of being solid as usual. The wheel 1 is connected to rotate in unison with a shaft or spindle 3 suitably journaled in the tubular axle or axle sleeve 2, for instance with the aid of bearing balls 36. The axle 2 is rigidly secured to an upright guide cylinder 4, here shown as having a slight inclination downwardly and forwardly (Fig. 1) as well as downwardly and outwardly (Fig. 2). The cylinder 4 extends in skew relation to the axle 2, for instance at the rear thereof, partly above and partly below the same, and surrounds a tube 5 slidable lengthwise relatively to said cylinder and projecting therefrom upwardly into another cylinder 7 rigidly secured to the vehicle frame 6. Suitable means, such as a flange 15 on the tube 5, co-operating with corresponding formations on the cylinder 7, are provided which permit the tube 5 to turn relatively to said cylinder, but prevent relative longitudinal movement of said parts. I have shown a cap 31 having an annular rib 32 engaging said flange 15. The cylinders 4, 7 and the tube 5 are co-axial, as shown, and their common axis intersects the road surface 9 in the neighborhood of the point at which the wheel 1 is in contact with the ground. The projection of this axis on the road surface 9 thus forms an angle both with the direction in which the car travels (toward the right in Fig. 1) and with the transverse axis of the vehicle.

The cylinder 7 receives the upper end of the tube 5, as stated above, and the flange 15, in addition to permitting said tube to turn relatively to the guide 7 while preventing relative lengthwise movement of these two parts, also has the function of supporting said tube and the parts connected therewith when the vehicle is lifted, and in this case preventing separation of the tube 5 from the guide 7. To the bottom end of the tube 5 is attached a piston 16 having a port 17 for the passage of the shock-absorbing liquid 18. The tube 5 contains a coil spring 8 the upper end of which bears against a member 20 rigidly connected with tube 5. The connection between the member 20 and the tube 5 is preferably obtained by the pin 21, of the steering knuckle 14, which pin is intended for transmitting the steering forces. A circumferential slot or recess 22 in the cylinder 7 permits the said knuckle and the tube 5 to turn relatively to the cylinder 7 about the axis thereof through an angle corresponding to the steering requirements, viz. about 60 degrees. The steering efforts are transmitted to the upright cylinder 4 since the latter is compelled to turn with the tube 5. For this purpose, the cylinder 4 may be provided with a diametral bolt 23 secured thereto rigidly and extending through a block 24 which is thus held stationary relatively to said cylinder. The ends of this block extend through longitudinal slots 25 in the tube 5, so that the parts 4, 5 are capable of relative lengthwise movement but held against turning relatively to each other. The lower end of the spring 8 bears against the slide block 24. The length of the slots 25 corresponds to the play of the spring 8. The tube 5 is guided in the cylinder 4 on the one hand by the piston 16 and on the other hand by a sleeve 26 which, like the piston 16, is made of bronze. This sleeve 26 is provided with a cup-shaped extension 27 intended for collecting the lubricating liquid. The liquid collected in the cup-shaped extension 27 will have a free downward flow through longitudinal ducts or channels 26' of the sleeve 26 and will reach the space at the bottom of the cylinder 4. The bottom end of the cylinder 7 is also provided with a bearing sleeve 28. In order to prevent the entrance of dust etc., I may provide a leather bellows arrangement, as indicated at 29, to obtain dust-proof joints at the points where the tube 5 engages the sleeves 26 and 28 respectively.

In order to enable the shock absorbing effect of the liquid 18 to be varied, the port 17 of the piston 16 may be adjustable in size. The same result may be obtained by means of a tapered pin 30 fastened to the bottom cap 40 of the cylinder 4 and adapted to project into the piston port 17, it being understood that the passage of liquid through said port will be obstructed more or less according to the relative position of the pin 30 and the piston. The movement of the piston 16 may also be utilized for a lubrication both of the telescopic tubular guide and of other mechanical parts of the vehicle.

Since the axle 2 is rigidly connected to the cylinder 4, a steering movement will be imparted to the wheel 1 when such cylinder is turned about its axis by means of the bolt 23, block 24, tube 5, pin 21, and knuckle 14. When the elastic wheel support described above is to be used for vehicle wheels not intended to be steered, the tube 5 evidently will not need to turn relatively the vehicle, but can be connected with it rigidly. In this case the block 24 would not transmit a steering movement from the tube 5 to the cylinder 4, but would simply prevent a relative turning movement of these parts.

As shown in Figs. 1, 2, 3, and 4, a brake drum 33 may be connected with the wheel 1. Such a brake drum might also be disposed on the other side of the telescopic tubular guide, that is, between the frame of the vehicle and the said telescopic tubular guide. In case the wheel 1 is to be a driven wheel, the connection of the shaft or spindle 3 with the drive shaft may be effected at the inner end of said spindle, as indicated at 34 (Figs. 2 and 3). This drive must, of course, be of some flexible type, since the wheel 1 moves up and down continuously as the car travels. The coil spring 8 may also be replaced with other elastic or cushioning means, such as rubber, compressed air or the like.

For lubricating purposes, the flange 15 may be provided with a recess 15' adapted to hold a lubricant and extending to the joint between said flange and the cylinder 7, so as to convey lubricant to said joint. The lubricant might be simply filled into the cap 32.

In the embodiment illustrated by Figs. 4 and 5, the cylinder 4 surrounds a special guide tube 37 which is rigidly connected with the bottom portion of said cylinder. This guide tube is secured to the cylinder by a clamping connection 38, 39 of detachable character, so as to permit inspection upon disconnecting these parts. The thickened lower portion 38 of the cylinder 4, like the mating portion 37' of the guide tube 37, is serrated so as to lock these two members against turning relatively to each other. The connection may be loosened or tightened by unscrewing the cap 40 or screwing it home respectively. Instead of employing a detachable connection, the cylinder 4 may be made integral with, or welded to, the guide tube 37.

The guide tube 37 is in sliding engagement with the cylinder 7, connected to the frame of the vehicle by a special auxiliary sleeve 43 which is secured to the cylinder 7 by a clamping joint consisting of the press fit 44 and the screw thread 45. The said sleeve 43 carries the boss or projection 41 which can be connected to the tube 6 of the vehicle frame by a threaded coupling 42. The mating portions of this coupling are provided with interlocking serrated surfaces 46 in order that the torque, which develops particularly when braking, may be safely transmitted to the frame of the vehicle. Moreover, since the axis of the screw connection 42 extends transversely of the vehicle frame, these serrations enable a fine adjustment of the angle of inclination of the whole tubular guide relatively to the vertical in the direction of travel. Such an adjustability is also very advantageous when the telescopic tubular guide is inclined in two directions as described above. Moreover this threaded joint or coupling 42 with its serrations 46 allows of a ready and quick removal of the road wheel 1 together with the telescopic tubular guide. The clamping joint 44, 45 at the auxiliary sleeve 43 facilitates assembling, since over almost the whole length of the sleeve 43 there remains a free space between the latter and the cylinder 7, so that uneven spots on the inside surface of the sleeve 43, as produced for instance, by welding the boss 41 to it or by pressing or rolling the sleeve, will not interfere with the application or the removal of the said sleeve.

In my divisional application Ser. No. 333,689 for "Joint for wheel suspension device," filed May 6, 1940, I have claimed the above-described joint as applied to a wheel suspension of the present general character.

Fig. 4 illustrates the construction as it would be used in connection with a steered road wheel. For this purpose, the upper end of the cylinder 7 is provided with a thrust bearing acting in both directions and comprising the flange 15 of the cylinder 7 and the revoluble bushing 47 with the washer 48. The upper end of the coil spring 8 bears against the said bushing. The lower end of the coil spring 8 bears, through a washer 49, against an internal flange 50 of the guide tube 37.

For steering there is provided a steering knuckle pivot the design of which is similar to that of the tube 5 in the embodiment according to Fig. 2. The upper end of this steering pivot tube 5 is rigidly connected with the thrust bearing member 15 and the knuckle 14 by the screw 51. The knuckle 14 is prevented from turning on the steering tube 5 by a plurality of flutes. The transmission of the partial rotation from the steering tube 5 of the guide tube 37, for steering purposes, is effected as follows: The lower end of the steering tube 5 is provided with fine external serrations or flutes upon which an annular piston 16' provided with corresponding internal serrations or flutes is pressed, and secured in this position by a threaded plug 52. On its outer surface the annular piston 16' is provided with a coarse serration 16" which is in engagement with a corresponding serration 37" on the inside wall of the guide tube 37. Therefore, on account of the outside serration of the piston 16', the tube 5 can not turn relatively to the guide tube 37, but the serration or fluting is such as to permit the piston to move longitudinally relatively to said guide tube. Since the latter is rigidly connected to the cylinder 4 and through it to the axle 2, any angular displacement of the knuckle 14 will therefore be transmitted through the tube 5 with its piston 16' to the guide tube 37, the cylinder 4 and the axle 2, and thereby to the spindle 3 of the road wheel 1. The pitches of the serrations at the top and bottom ends of the steering pivot tube 5 may be different, so that by turning one member through an angle corresponding to one tooth of the serration, a vernier effect is obtained inasmuch as the different pitch of the serration at the other end results in an angular displacement through an angle which is much smaller than the thickness of one tooth of the first-mentioned serration. This vernier effect may also be extended to the serration on the outside surface of the annular piston 16', in addition to the vernier effect obtained by the two serrations at the upper and the lower ends of the steering pivot tube 5.

With the aid of the annular piston 16' and the threaded plug 52 a hydraulic shock absorber can also be provided for in this embodiment of the invention. A novel and advantageous feature of this embodiment is the fact that during the longitudinal movement of the annular piston 16' the serration or fluting on the outside surface of the annular piston 16' for transmitting the torque from the pivot tube 5 to the guide tube 37 is continually bathed by the oil pumped through, which is used as the shock absorbing liquid. Since the serration used as a means for transmitting the torque constitutes a large surface, such as automatic pressure oil lubrication with continuous passage of the lubricating oil is particularly efficacious.

The shock absorber piston 16', 52, is adapted to engage rubber buffers, namely a rubber cushion or stop 53 arranged in the closing cap 40 below said piston, and three rubber rings 54 arranged above the piston, between the washers 55 and 56. These washers are introduced in a vertical position from the lower end of the guide tube 37 through two recesses located diametrically opposite each other in the serration of the guide tube 37 and subsequently turned into their approximately horizontal position so as to bear respectively against the internal flange 50 and the upper end of the internal serration of the guide tube 37.

The design of the telescopic tubular guide made as above described permits the arrangement of an automatic circulation system lubrication under pressure with the aid of the members already provided for the tubular guide proper. For this purpose it is only necessary to provide a check valve 57 in the threaded plug 52 and a small pipe 58 communicating with the passage provided with the port 17, which pipe extends from the piston 16' upwards as far as the thrust bearing 15. A cup-like shell 59 surrounds the pipe 58, a greasing chamber being formed between said cup and the thrust bearing 15. At each compression of the telescopic tubular guide a portion of the lubricant present below the piston 16' will be pressed upwards, its return flow being prevented by the check valve 57. This lubricant is continuously delivered through ports 60' in the pivot tube 5 and in the bushing 47, and through the oil grooves 60 to the thrust bearing 15, 47, 48 and after having passed through the same it flows again downwards along the internal wall of the guide cylinder 7. This results at the same time in a continuous lubrication of the inner sliding surface of the guide cylinder 7 and the outer sliding surface of the guide tube 37. This effect can even be increased by utilizing the vacuum developing below the shock absorber piston 16', 52 when the telescopic spring is released. For this purpose one check valve or a plurality of check valves 61 disposed at the lower end of the cylinder 4 are intended for connecting the annular space between the guide tube 37 and the cylinder 4, with the space below the shock absorber piston 16', 52 when the piston is moving upwards, and for closing such connection as soon as the piston 16', 52 begins to descend. The bellows 29 between the top of the cylinder 4 and the guide cylinder 7 not only prevents leakage and the entrance of dust, but encloses in a special chamber, the outer surface of the lower guide tube 37, which surface is exposed when the members of the telescopic tubular guide move relatively to each other. The provision of the check valves 61 in the cylinder of the shock absorber and the check valve 57 in the piston of the shock absorber results in an increased pressure of the coil at the thrust bearing 15 and in a suction by vacuum at the outer sliding surface of the guide tube 37 within the bellows 29. Consequently there is established a continuous, automatic circulation of the shock absorber liquid which is used as a lubricant.

When the vehicle wheel 1 is to be used without a steering device in combination with the telescopic tubular guide, the upper thrust bearing 15 is replaced by a rigid connection. The steering pivot tube 5 may then be omitted or used as a guide for the coil spring 8 by being rigidly connected to the member 15, the members 47, 48 and 60 being omitted at this point. In this design the telescopic tubular guide may also be used as a so-called spring leg for aeroplanes.

The various features of the invention, for instance the arrangement of the slide directly by the side of the axle 3, the double inclination of the upright shock absorber axis, the simultaneous use of the shock absorber piston as an oil pump, and the automatic circulation system lubrication in combination with the shock absorber piston, may be utilized each by itself and afford each by itself the advantages set forth. The tubular guides shown are simply examples, and the several parts thereof may be modified without departing from the nature of my invention as set forth in the appended claims.

I claim:

1. In a vehicle, a vehicle wheel, a member for supporting said wheel rotatably, said member being provided with an upright cylinder and with a guide tube rotatable for adjustment about the axis of said cylinder, means for locking said tube against rotation relatively to said cylinder after adjustment, said guide tube projecting upwardly from said cylinder, a second cylinder secured to the frame of the vehicle and fitted to slide over the upper portion of said guide tube, and cushioning means interposed between said second cylinder and the member supporting the vehicle wheel.

2. In a vehicle, a vehicle wheel, a member for supporting said wheel rotatably, said member being provided with an upright cylinder and with a guide tube extending within said cylinder and projecting upwardly therefrom, a second cylinder fitted to slide over the upper portion of said guide tube, an auxiliary sleeve connected with the frame of the vehicle and surrounding said second cylinder adjustably, means for locking said auxiliary sleeve to said second cylinder after adjustment, and cushioning means interposed between said second cylinder and the member supporting the vehicle wheel.

3. In a vehicle, a vehicle wheel, a member for supporting said wheel rotatably, said member being provided with an upright cylinder and with a guide tube extending within said cylinder and projecting upwardly therefrom, a second cylinder fitted to slide over the upper portion of said guide tube, a normally rigid connection between said second cylinder and the frame of the vehicle, said connection including a joint permitting the said second cylinder and the parts connected therewith to be rotated for adjustment about an axis transverse to the axis of said second cylinder, means for locking said second cylinder to said frame after such adjustment, and cushioning means interposed between said second cylinder and the member supporting the vehicle wheel.

4. In a vehicle, a vehicle wheel, a member means for cushioning said member relatively to the frame of the vehicle, means for holding the upper end of said cushioning means against up-and-down movement relatively to said frame while permitting relative rotary movement, steering mechanism connected with said upper end of the cushioning means, a normally rigid connection between said member and the lower portion of said cushioning means, said connection including a vernier adjustment about the longitudinal axis of the cushioning means, and permitting the lower end of said cushioning means to move up and down relatively to said member while normally holding said means against turning relatively to said member.

5. In a vehicle, a vehicle wheel, a member for supporting said wheel rotatably, said member being provided with an upright cylinder and with a guide tube extending within said cylinder and projecting upwardly therefrom, a normally rigid connection between said guide tube and said cylinder, said connection including a joint with serrations permitting said guide tube to be rotated for adjustment about its longitudinal axis, means for locking said guide tube to said cylinder after adjustment, a piston movable lengthwise in said guide tube and having longitudinal serrations in sliding engagement with corresponding serrations on the inner surface of said guide tube, the pitch of said serrations being different from that of the first-mentioned serrations, a connection between said piston and the frame of the vehicle, and means for cushioning the member supporting the vehicle wheel, relatively to the frame of the vehicle.

6. In a vehicle, a vehicle wheel, and upright cushioning means interposed between said wheel and the frame of the vehicle, the longitudinal axis of movement of said means passing, in skew relation, to the rear of the axis of said wheel and being inclined both transversely of the vehicle and also forwardly and downwardly, said longitudinal axis intersecting the road surface approximately at the point at which the wheel is in contact with the ground.

7. In a vehicle, a vehicle wheel, a member for supporting said wheel rotatably, an upright telescopic guide closed to the outside space, said guide comprising an upper member connected with the frame of said vehicle, and a lower member connected with said wheel-supporting member, a pivot member located within said guide coaxially therewith, the lower portion of said pivot member being held to turn with said lower member of the telescopic guide, and steering means connected with the upper portion of said pivot member.

8. In a vehicle, a vehicle wheel, a member for supporting said wheel rotatably, an upright guide for connecting said member with the frame of the vehicle, said guide comprising an exterior lower cylinder connected with said member and an interior cylinder connected with the vehicle and extending downwardly into said lower cylinder, means for collecting a lubricant above the point at which said interior cylinder emerges from the upper portion of said lower cylinder, and means for guiding said interior cylinder at said point relatively to said exterior cylinder, said guiding means being provided with channels for the passage of lubricant from the first-mentioned means to the space at the bottom of said upright guide.

FRIEDRICH EUGEN MAIER.

CERTIFICATE OF CORRECTION.

Patent No. 2,220,254. November 5, 1940.

FRIEDRICH EUGEN MAIER.

It is hereby certified that error appears in the printed specification of the above numbered patent requiring correction as follows: Page 4, first column, line 60, claim 4, after the word "member" insert --for supporting said wheel rotatably, upright--; and that the said Letters Patent should be read with this correction therein that the same may conform to the record of the case in the Patent Office.

Signed and sealed this 10th day of December, A. D. 1940.

(Seal)

Henry Van Arsdale,
Acting Commissioner of Patents.